United States Patent [19]
Yamamoto

[11] Patent Number: 5,137,407
[45] Date of Patent: Aug. 11, 1992

[54] HEAD DRIVE FOR THREADED FASTENER
[75] Inventor: Kozo Yamamoto, Tokyo, Japan
[73] Assignees: OSG Corporation, Aichi; Kozo Yamamoto, Tokyo, both of Japan
[21] Appl. No.: 615,574
[22] Filed: Nov. 19, 1990
[30] Foreign Application Priority Data
  Nov. 22, 1989 [JP] Japan .................................. 1-303961
  Jun. 29, 1990 [JP] Japan ............................... 2-69521[U]
[51] Int. Cl.[5] ........................ F16B 23/00; F16B 35/06
[52] U.S. Cl. .................................. 411/404; 411/405; 411/919
[58] Field of Search ............... 411/404, 403, 405, 407, 411/410, 919

[56] References Cited
U.S. PATENT DOCUMENTS

| | | | |
|---|---|---|---|
| 2,046,839 | 7/1936 | Phillips et al. | 411/404 |
| 2,066,484 | 1/1937 | Phillips | 411/404 |
| 2,129,440 | 9/1938 | Olson | 411/404 |
| 2,445,978 | 7/1948 | Stellin | 411/404 |
| 2,764,197 | 9/1956 | Torresen | 411/404 |
| 3,352,190 | 11/1967 | Carlson | 411/919 |
| 3,400,626 | 9/1968 | Bergere | 411/919 |
| 3,584,667 | 6/1971 | Reiland | 411/402 |
| 4,006,660 | 2/1977 | Yamamoto et al. | 411/405 |

Primary Examiner—Neill R. Wilson
Attorney, Agent, or Firm—Bachman & LaPointe

[57] ABSTRACT

A threaded fastener having a recess or projection in a head for engagement with a jointing equipment is disclosed. The recess or projection is composed of a center portion and radial portions extending radially outward of circumference of the center portion. Each of the radial portions includes a pair of straight line section and a rounded corner to prevent stress concentration for providing substantial strength against press-molding and applied torque.

5 Claims, 9 Drawing Sheets

5,137,407

HEAD DRIVE FOR THREADED FASTENER

BACKGROUND OF THE INVENTION

1. Field of the Invention

The present invention relates generally to a threaded fastener.

2. Description of the Background Art

Generally, threaded fasteners having a portion for bit engagement in which six radial portions extend in radial directions are well known in the art.

Conventionally, a threaded fastener is composed of a head and a threaded shaft. In the head, an engaging portion, comprised of a groove or projection, is formed. The center portion of the groove or projection is circular to allow for insertion of a jointing equipment. Six radial portions are equally spaced around periphery of the center portion for holding a bit engagement with a jointing equipment to receive a torque derived from the equipment. A known threaded fastener of the above kind is shown in Japanese Utility Model Second Publication (allowed) No. 48-39959.

A plan view of the known threaded fastener is shown in FIG. 1. The threaded fastener is composed of a threaded shaft 1 and a head 2. The head 2 has a center portion A and six radial portions B extending in radial directions. The center and radial portions cooperate with each other to define a bit engaging portion 3. The bit engagement portion 3 is generated as follows. A root circle 5 is drawn which defines the center portion A. Six dummy circles 4 are equi-angularly spaced along the periphery of the circle 5. Another six dummy circles 6 having smaller diameter than the circles 4 are spaced therebetween, respectively. Two concentric circles 4' and 6' with the root circle 5 are drawn. The circle 4' interconnects the centers of the dummy circles 4, while the circle 6' interconnects the centers of the dummy circle 6. The profile of the portion 3 is formed along a line via a tangent point of the circle 4 with the root circle 5, parts of the circle 4 and parts of the circle 6. A plan view of another known threaded fastener is also shown in FIG. 2. In this type of threaded fastener, the profile of the portion 3 is determined along a line via tangent points of dummy circles 4 with the root circle 5, parts of the dummy circles 4, and parts of the dummy circle 7 drawn interconnecting the centers of the circles 4.

In the threaded fastener shown in FIG. 1, when a torque is applied to the bit engaging portion 3 by a jointing equipment, the torque converts a force W which works on the surface of each of the radial portions in a perpendicular direction. The force W is divided into two components forces F in a direction of a tangent line of circumference of the head and R in a radial direction. As a result, the force F is applied on the threaded fastener as a driving force. This driving force F is indicated by the following equation;

$$F = W \cos \alpha$$

wherein $\alpha$ is a driving angle defined by a tangent line $l_1$ to the radial portion B at a point of force applied and a radius drawn $l_2$ lined through this point. Therefore, corresponding to the reduction of the driving angle $\alpha$, a torque from the jointing equipment is converted to a rotating driving force F without loss. However, in this type of threaded fastener, the driving angle $\alpha$ becomes about 25° or so, conversion loss of torque becomes large.

In the threaded fastener shown in FIG. 2, when a point of force applied is located most remote from the portion, that is where the circumference of the circle 7 meets the circumference of the circle 4, the driving angle $\alpha$ becomes zero, then the conversion loss of torque also becomes zero. However, practically, because the engagement member of the jointing equipment is relatively smaller than the bit engaging portion, the point of force applied is slightly removed inward of a theoretical tangent point at which angle $\alpha$ becomes zero. Therefore, the conversion efficiency of torque fluctuates slightly corresponding to fluctuation of the point of force applied. As a result, stable and high conversion efficiency can not be obtained according to these types of threaded fasteners. Additionally, because corners of the radial portion B are shaped having angles of 90°, corners portions tend to be fragile to stress concentration when the bit engaging portion is press-molded.

SUMMARY OF THE INVENTION

It is therefore a principal object of the present invention to provide a threaded fastener with high conversion efficiency of torque.

It is another object of the present invention to provide a threaded fastener having stable conversion efficiency of torque.

It is further object of the present invention to provide a threaded fastener strong enough to withstand stress at edge portions of the recess, even when formed by press-molding.

In order to accomplish the aforementioned and other objects, a threaded fastener is composed of a threaded shaft and a head having a tightening torque receptacle which has a center portion and plurality of radial portions extending radially outward from a center portion, the radial portions being circumferrentially distanced at an angular interval less than 90°, each of radial portion has a torque receiving straight line section.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
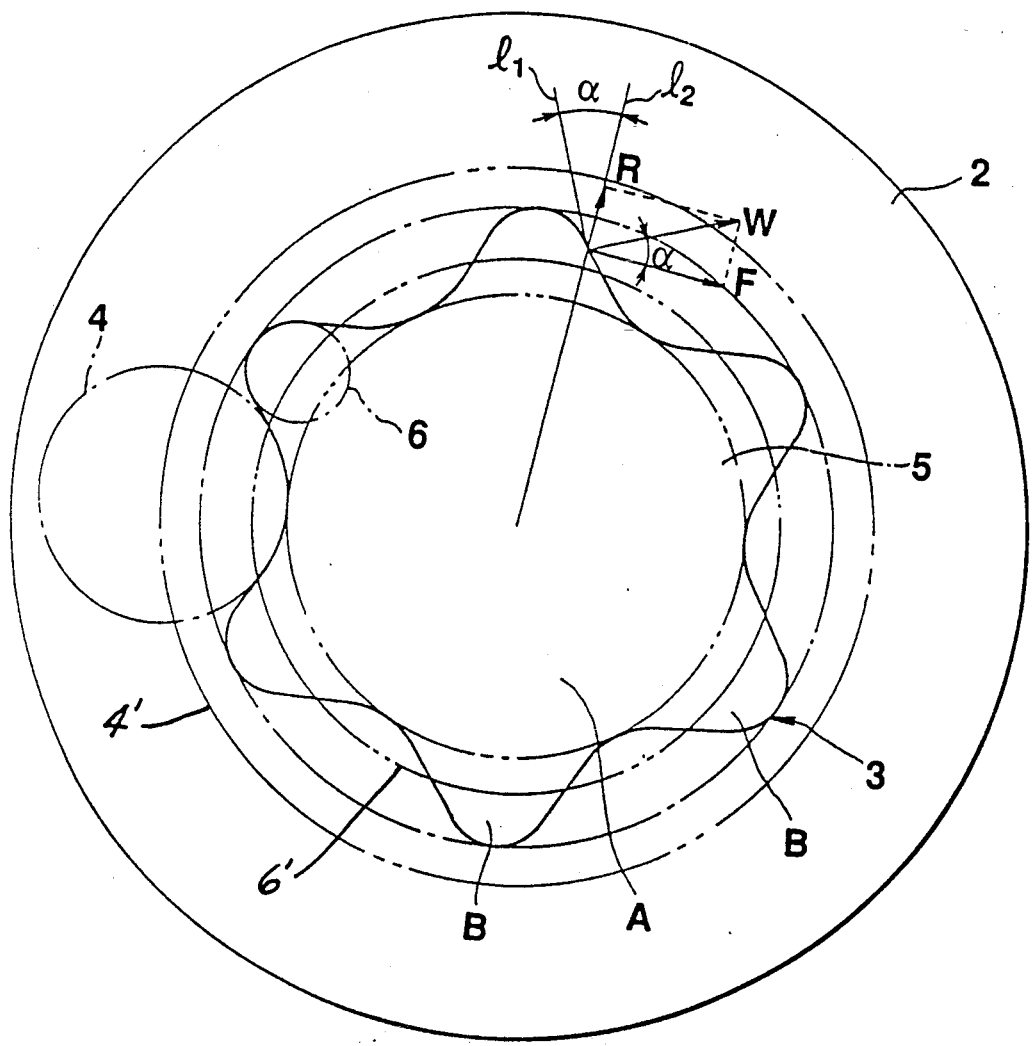
FIG. 1 is a plan view of a head of a threaded fastener according to the prior art.
Figure 2:
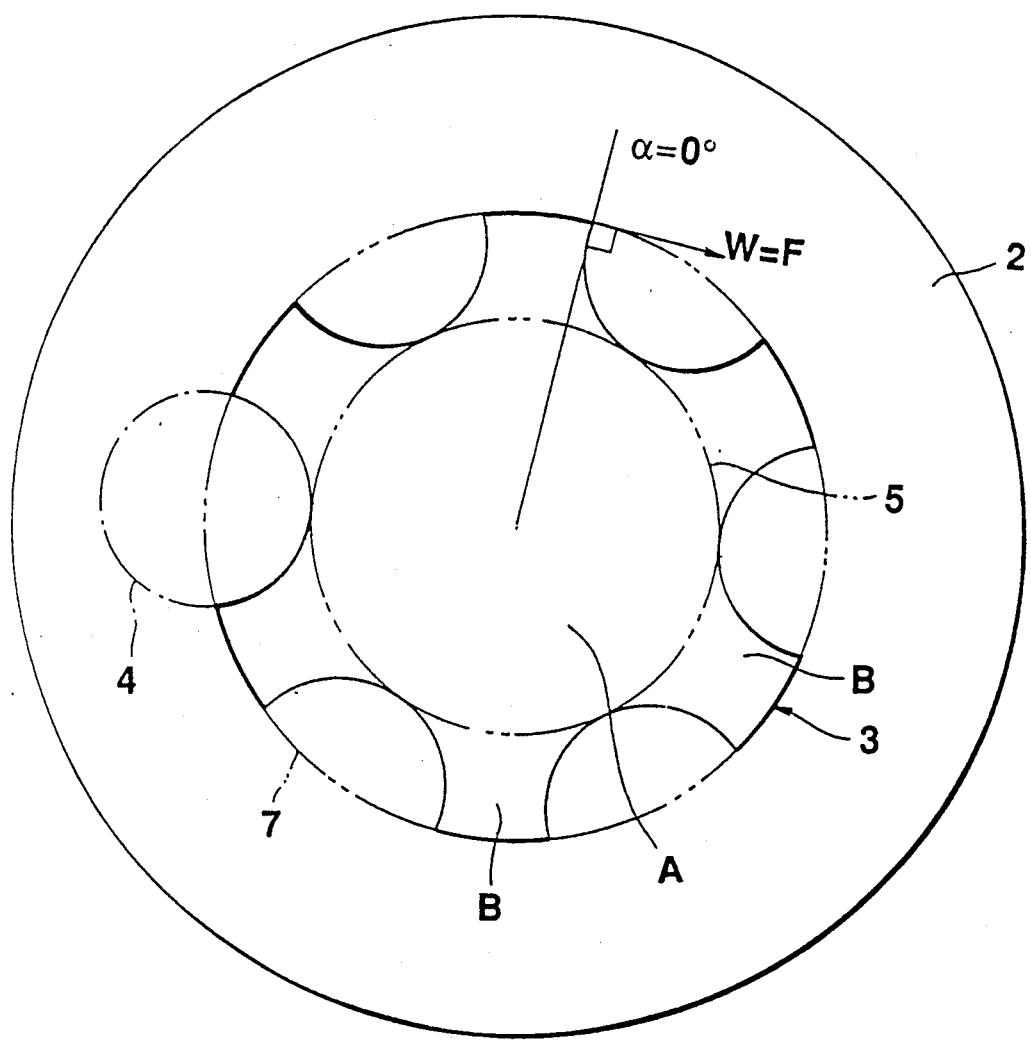
FIG. 2 is a plan view of a head of another threaded fastener according to the prior art.
Figure 3:
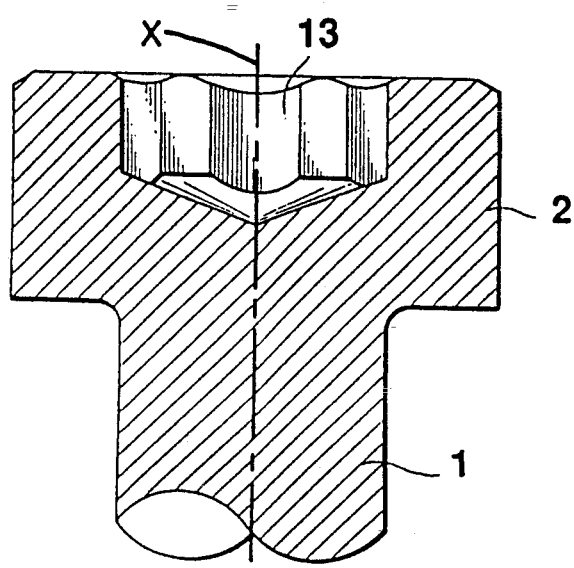
FIG. 3 is a cross sectional view of a first embodiment of a threaded fastener according to the present invention.
Figure 4:
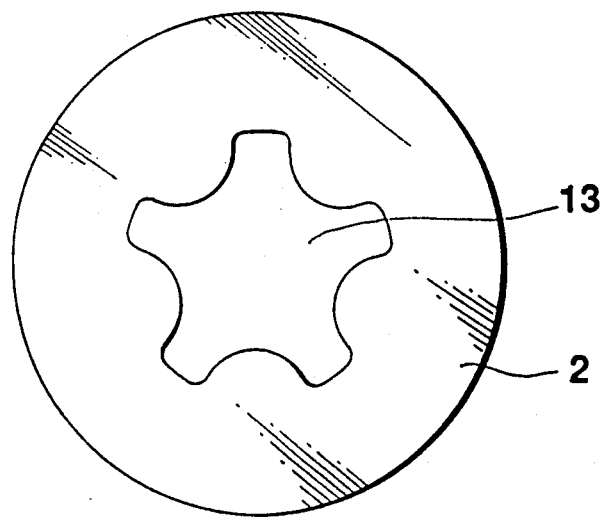
FIG. 4 is a plan view of a head according to the present invention.
Figure 5:
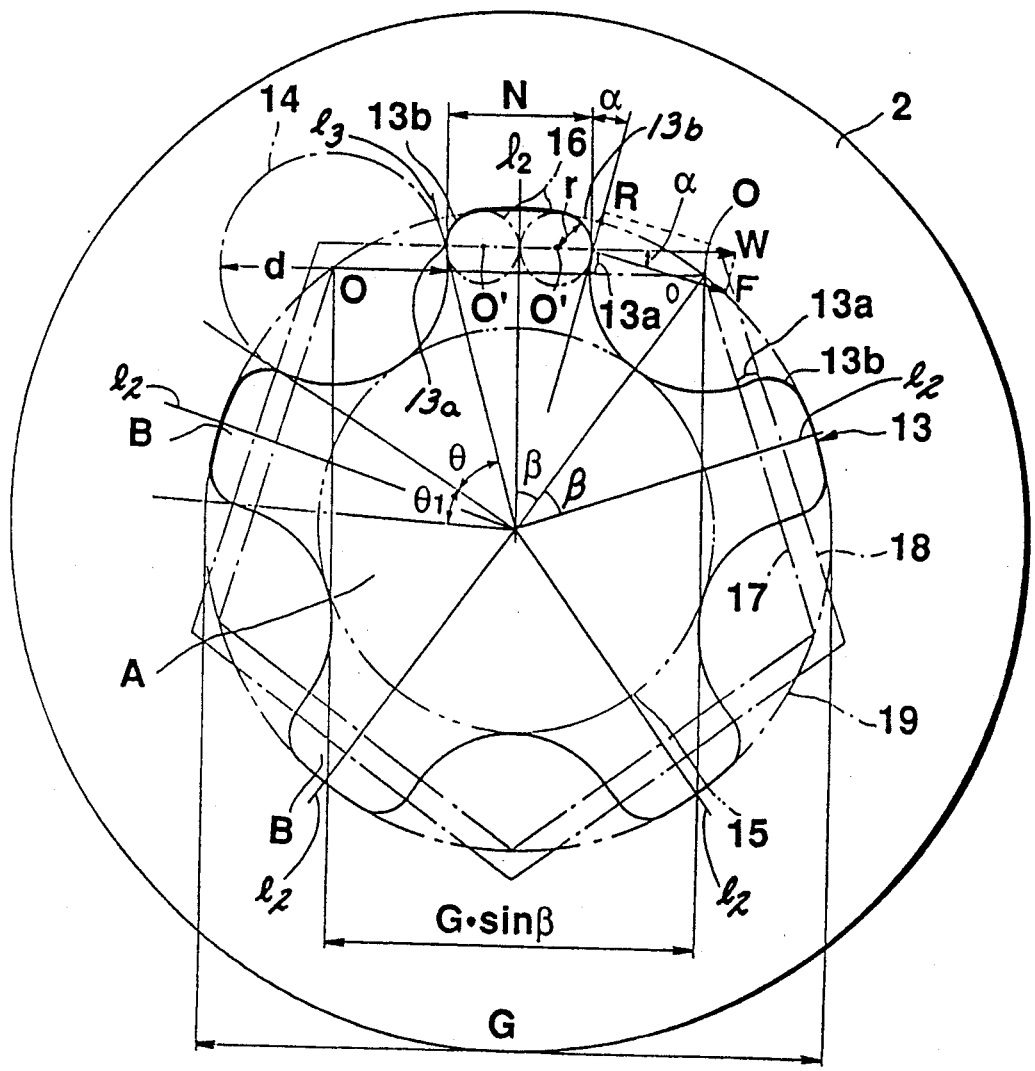
FIG. 5 is an enlarged plan view of a FIG. 4.

Referring now to the drawings, particularly to FIGS. 3 and 4, a threaded fastener having an axis X is composed of a threaded shaft 1 and a head 2 which is formed integrally with the top of the threaded shaft 1. The head 2 has a plurality (six in FIG. 5) of radius line $l_2$ emanating from the axis X. The plurality of radius lines $l_2$ are equi-angularly spaced, at an angle less than 90 degrees, one after another. A bit engaging recess 13 is formed in the head 2 about radius lines $l_2$ about the axis X and thus concentric with the threaded shaft 1. FIG. 5 is an enlarged plan view of FIG. 4. The bit engaging recess 13 is composed of a center portion A which a torque derived by a jointing equipment (not shown) is not directly applied to, and five radial portions B which radially extend outwardly from the center portion A, each radially extending about the corresponding one of the plurality of radius lines $l_2$. Each of the radial portions B has a pair of straight line sections 13a, The radial portions B are generated as form follows. Five dummy circles 14 are equi-angularly spaced along the periphery of the circle 15. A circle 19 is drawn interconnecting the centers O of the five dummy circles 14. Two dummy circles 16 each having a smaller diameter than the circle 14 are in tangential contact with the adjacent two of the circles 14, respectively, and also with the circle 19. A first pentagon 17 is drawn with each five sides thereof interconnecting the centers O of the adjacent two of the circles 14. A second pentagon 18 is drawn with each of five sides thereof interconnecting the center O' of the adjacent two of the circles 16. The profile of the recess 13 is generated as a result from drawing a line via tangent points of the circles 14 with the root circle 15, an inwardly facing part of each of the circles 14, the straight line sections 13a, each extending a first point on one of the circles 14 and a second point on the adjacent one of the circles 16, parts of the circles 16 which are remote from the axis X, parts of the circle 19. The first points of each pair of straight lines 13a are disposed on the adjacent one of the sides of the pentagon 17, while the second points of the pair of straight lines 13a are disposed on the adjacent one of the sides of the pentagon 18.

Figure 6:
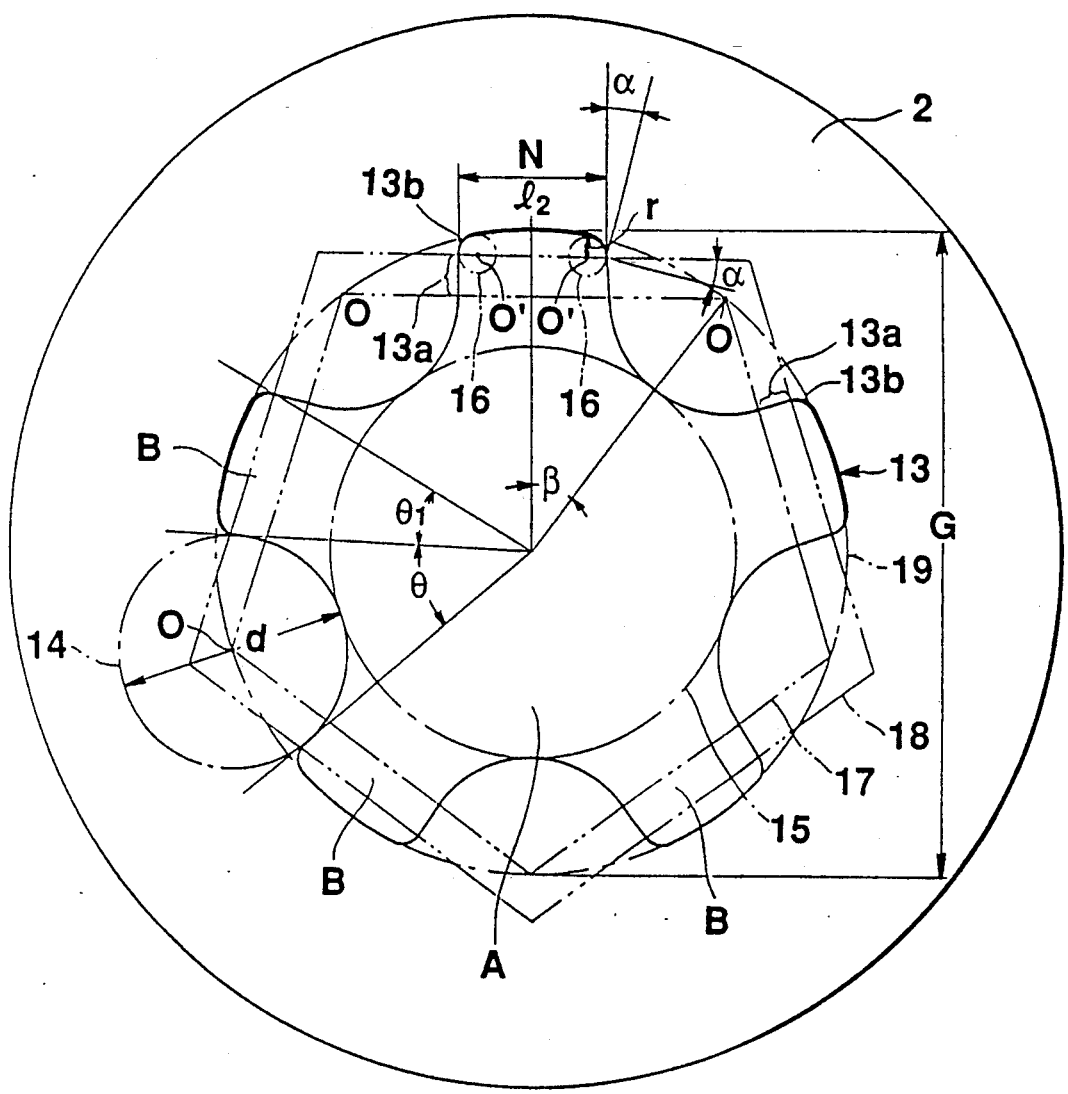
FIG. 6 is a plan view similar to FIG. 5.
Figure 7:
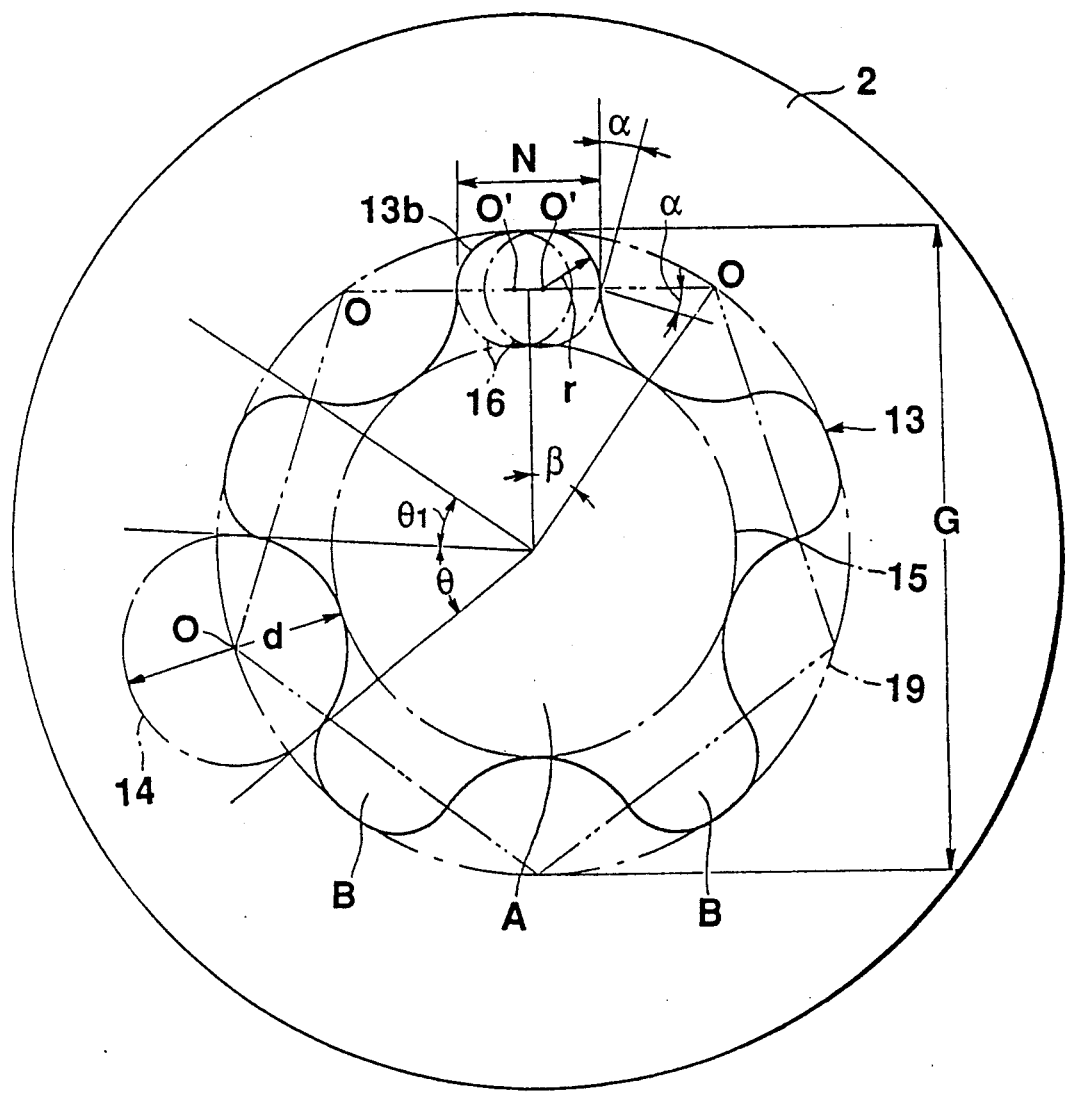
FIG. 7 is a plan view similar to FIG. 5.

Curvature of the rounded corners of each of the radial portions B of the recess 13 depends on variation of radius r of the dummy circle 16. Concurrently, the length of the straight line sections 13a also depends on radius r. FIG. 6 shows the case where r=N/8 (wherein N is width of the radial portion B), and FIG. 7 shows the case of r=G/2×(1=cos β) (wherein G is diameter of a circle 19 which indicates peripheral circumference of the groove 13, β is a central angle defined by lines extending between the groove center and the center of N and the center of the circle 14, respectively). When r becomes a shorter than N/8, curvature of the rounded portion is not strong enough to withstand press-molding (see FIG. 6). On the other hand, when r becomes longer or equal to G/2×(1−cos β), the straight portion 13a can not be obtained (see FIG. 7). Therefore, the preferred range of radius r of the dummy circle 16 is determined within the range as follows:

$$N/8 \leq r < G/2 \times (1 - \cos \beta).$$

The ratio of central angle $\theta$ defined by the circumference of the circle 14 against central angle $\theta_1$ defined by the circumference of the circle 16 depends on diameter d of the circle 14. Sheared sections of the bit engaging groove 13 and the bit of the jointing equipment are substantially the same when $$\theta : \theta_1 = 1.4 : 1$$

This ratio is preferred because durability of the jointing equipment increase. Central angles $\theta$ and $\beta$ at this ratio are indicated in the following formula;

$$\theta = 360°/n \times 1.4/2.4$$

$$\beta = 360°/2n$$

wherein n : number of the radial portions B.

Therefore, when number of the portions B is five, $\theta = 42°$ and $\beta = 36°$, when number of the portions B is six, $\theta = 35°$ $\beta = 30°$, etc.

Figure 8:
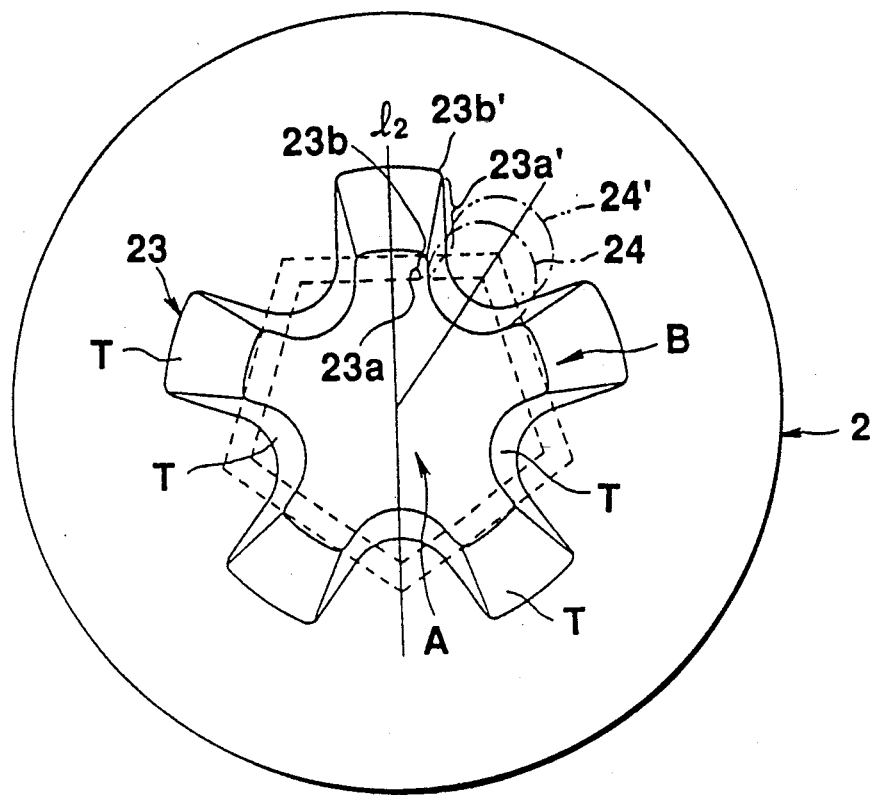
FIG. 8 is a plan view of a head of a second embodiment of a threaded fastener according to of the present invention.
Figure 9:
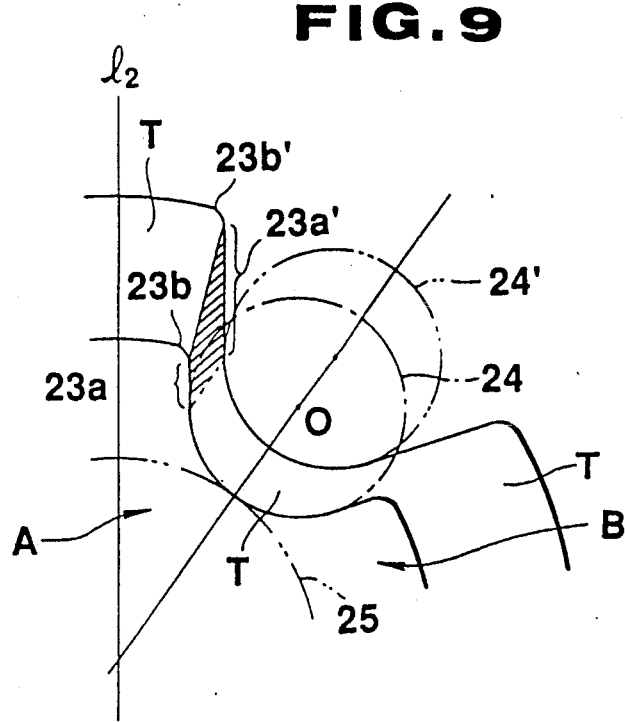
FIG. 9 is an enlarged partial view of FIG. 8.

FIGS. 8 and 9 show a head according to the second embodiment of the present invention. A groove 23 having five extended portions extending in radial directions from the center thereof is formed in a converted tapered configuration. Profiles of bottom and top thereof are formed in the same manner of the previously mentioned first embodiment. However, top of the groove 23 is formed with a slightly larger diameter than that of bottom except the diameter of dummy circles 24'. Diameter of the circles 24' are formed to have same diameter 24 as those on the bottom of the groove. Thus, an inner circumference of the groove 23 is shaped as an outwardly tapered surface T. This derives straight line 23a' longer than that of 23a which is formed on the bottom of the groove 23. Thus, all straight portions of the surface T of the recess taper widely.

It is also possible that, instead of the recess 23, a portion is formed which has the same profile (five radially extended portions). However, in this case, the projection is formed when a tapered configuration with the bottom thereof being wider.

Same jointing equipment can be used without concern for threaded fastener sizes if the recess top and the projection bottom are formed to have same diameter.

Figure 10:
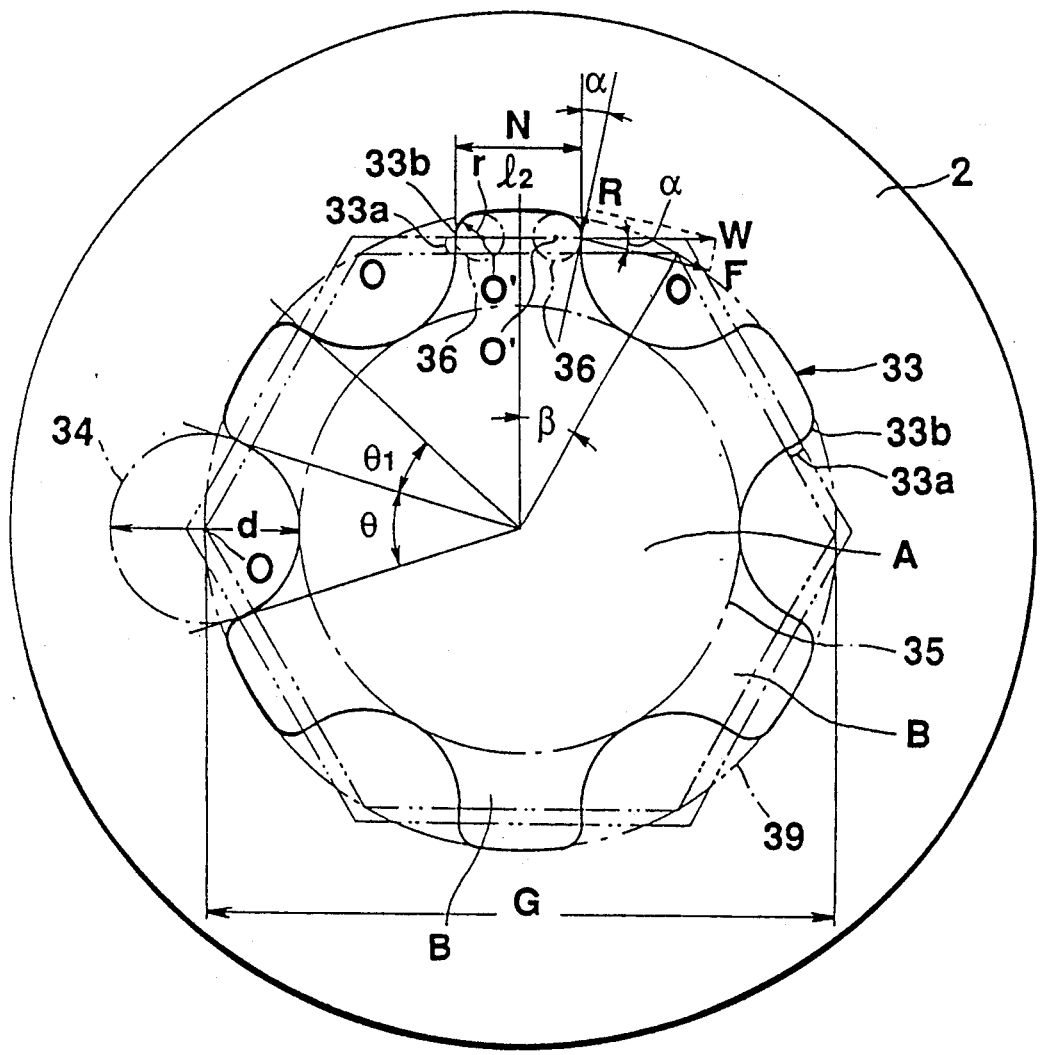
FIG. 10 is a plan view of a head of a third embodiment of a threaded fastener according to the present invention.
Figure 11:
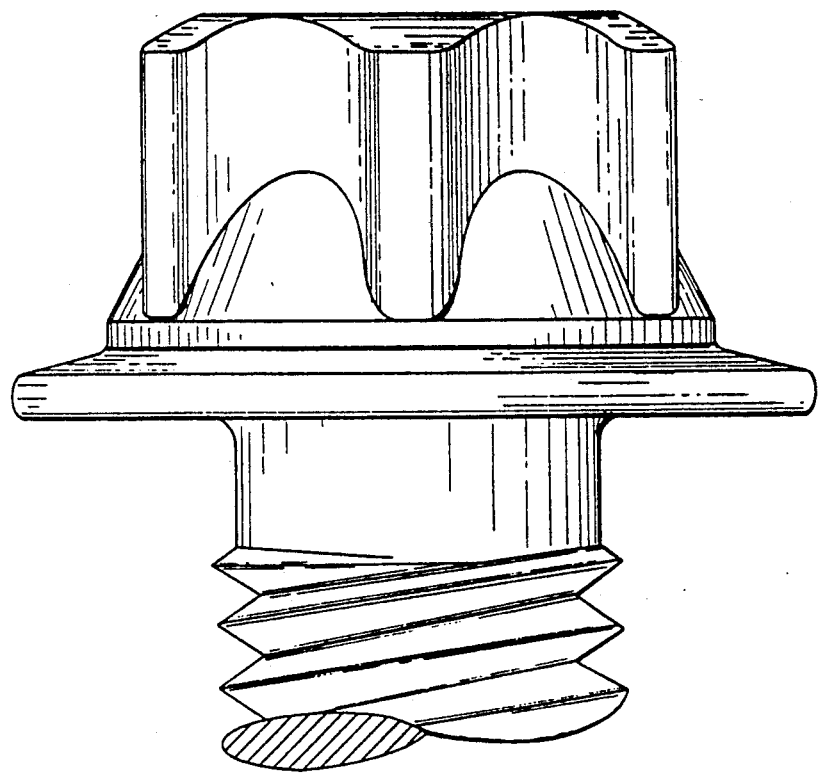
FIG. 11 is a side elevation of a part of the head of FIG. 8 according to the third embodiment of the present invention.

FIG. 10 shows a head having six radial portions in a recess according to the third embodiment of the present invention. The recess is formed in the same manner as the previously mentioned embodiment, and it can be also be formed with a converted tapered configuration or alternatively, tapered projection as aforementioned.

When manufacturing the threaded fastener of the present invention, a punching machine of the same profile as desired recess is used for press-molding of the head. The head is broken by shearing force derived from the punching machine corresponding to pressure applied. Thus, a bit engaging recess can be obtained substantially along the profile of the punching machine. According to the present invention, because corners of the radial portions of the recess are formed in rounded shape, stress concentration cannot be caused at those portions, therefore, fragility of the corners does not occur.

Corresponding to rotation of the jointing equipment, a torque from the jointing equipment is applied to an inner surface of the radial portions in the recess, and the threaded fastener is threaded into a threaded fastener hole. When a torque is converted to rotating driving force, the force application point on the portion may fluctuate due to slight relaxing of the engagement between the jointing equipment and the recess. However, according to the present invention, sections are straight line formed adjacent the force application point, thus fluctuation points are on the straight line sections of the surface of the portion. Therefore, driving angle $\alpha$ is kept substantially constant always and is kept to a relatively small value, i.e., $\alpha = 15°$. Accordingly, stable and high conversion efficiency of torque can be obtained.

Additionally, if the engaging portion of the head is formed of a converted tapered groove or tapered projection, insertion of the jointing equipment can be accomplished more easily.

While the present invention has been disclosed in terms of the preferred embodiment in order to facilitate better understanding of the invention, it should be appreciated that the invention can be embodied in various ways without depending from the principle of the invention. For example, a head having same diameter of that of a threaded shaft and helical projections (thread) on a circumference thereof can be available. Therefore, the invention should be understood to include all possible embodiments and modification to the shown embodiments which can be embodied without departing from the principle of the inventions as set forth in the appended claims.

What is claimed is:

1. A threaded fastener comprising:
    a threaded shaft having an axis (X) and an integral head, said integral head having a plurality of radius lines ($l_2$) emanating from said axis (X), said plurality of radius lines ($l_2$) being equi-angularly spaced, at an angle less than 90°, one after another about said axis (X),
    said integral head having a center portion radially extending about said axis and a plurality, corresponding in number to said plurality of radius lines ($l_2$), of radial portions radially extending outwardly from said center portion, each of said plurality of radial portions radially extending about the corresponding one of said plurality of radius lines ($l_2$),
    said center portion (A) being defined by a first circle (15) having a center on said axis (X),
    each of said radial portions (B) being partly defined by the adjacent two of second circles (14) of the same diameter, said second circles (14) being in contact with said first circle and equi-angularly spaced one after another, said second circles having their centers disposed on a third circle (19) which is concentric with said first circle (15),
    each of said radial portions (B) being partly defined further by a pair of fourth circles (16) of the same diameter disposed between said adjacent two of said second circles (14) in contact therewith, respectively, said pair of fourth circles (16) being in contact with said third circle (19),
    each of said radial portions (B) having and being defined by a pair of straight line sections (13a), each extending from a first point on one of said second circles (14) to a second point on that one of said pair of fourth circles (16) which is in contact with said one of said second circles (16),
    said first points of said pair of straight line sections (13a) being disposed on a first line segment (17) interconnecting said centers (O) of said adjacent two of said second circles (14),
    said second points of said pair of straight line sections (13a) being disposed on a second line segment (18) interconnecting said centers (O') of said pair of fourth circles (16).

2. A threaded fastener as set forth in claim 1, wherein each of said torque receiving portions is defined partly by said third circle (19).

3. A threaded fastener as set forth in claim 2, wherein each of said torque receiving portions is defined partly by said pair of fourth circles (16).

4. A threaded fastener as set forth in claim 2, wherein each of said pair of fourth circles (16) has a radius (r), said second points on said second line (18) interconnecting said centers of said fourth circles (16) are spaced by a distance (N) (wherein N is the width of each of said torque receiving portions), said third circle (19) has a diameter (G), the adjacent two of said radius lines are angularly distant by two times an angle $\beta$.

5. A threaded fastener as set forth in claim 4, wherein said radius (r) of each of said pair of fourth circles (16) is defined by:

$$N/8 \leq r < G/2 \times (1 - \cos \beta).$$

* * * * *

UNITED STATES PATENT AND TRADEMARK OFFICE
CERTIFICATE OF CORRECTION

PATENT NO. : 5,137,407
DATED : August 11, 1992
INVENTOR(S) : Kozo Yamamoto It is certified that error appears in the above-identified patent and that said Letters Patent is hereby corrected as shown below:

Column 6, claim 2, line 31, delete "torque receiving" and insert therefor --radial--.

Column 6, claim 3, line 34, delete "torque receiving" and insert therefor --radial--.

Column 6, claim 4, line 41, delete "torque receiving" and insert therefor --radial--.

Signed and Sealed this

Twenty-first Day of September, 1993

*Attest:*

BRUCE LEHMAN

*Attesting Officer*   Commissioner of Patents and Trademarks